US010829654B2

(12) United States Patent
Ando et al.

(10) Patent No.: US 10,829,654 B2
(45) Date of Patent: *Nov. 10, 2020

(54) OIL-BASED INKJET INK

(71) Applicant: RISO KAGAKU CORPORATION, Tokyo (JP)

(72) Inventors: Kazuyuki Ando, Ibaraki (JP); Shinichiro Shimura, Ibaraki (JP); Marie Morinaga, Ibaraki (JP); Hikaru Sugiura, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 314 days.

This patent is subject to a terminal disclaimer.

(21) Appl. No.: 15/904,504

(22) Filed: Feb. 26, 2018

(65) Prior Publication Data
US 2018/0244940 A1  Aug. 30, 2018

(30) Foreign Application Priority Data

Feb. 28, 2017 (JP) .................................. 2017-035942
Sep. 28, 2017 (JP) .................................. 2017-188389

(51) Int. Cl.
| C09D 11/36 | (2014.01) |
| C09D 11/102 | (2014.01) |
| C09D 11/322 | (2014.01) |
| C09D 11/033 | (2014.01) |
| C09D 11/037 | (2014.01) |
| C09D 11/324 | (2014.01) |

(52) U.S. Cl.
CPC ............ *C09D 11/36* (2013.01); *C09D 11/033* (2013.01); *C09D 11/037* (2013.01); *C09D 11/102* (2013.01); *C09D 11/322* (2013.01); *C09D 11/324* (2013.01)

(58) Field of Classification Search
None
See application file for complete search history.

(56) References Cited

U.S. PATENT DOCUMENTS

| 4,338,133 | A | 7/1982 | Toyoda |
| 5,968,244 | A * | 10/1999 | Ueda .................... C09D 11/322 106/31.86 |
| 5,980,624 | A | 11/1999 | Ichikawa et al. |
| 6,113,679 | A | 9/2000 | Adkins et al. |
| 7,834,072 | B2 | 11/2010 | Carlini et al. |
| 8,038,784 | B2 | 10/2011 | Watanabe et al. |
| 8,440,010 | B2 | 5/2013 | Endo |
| 8,507,585 | B2 | 8/2013 | Hosoya et al. |
| 9,624,394 | B2 | 4/2017 | Endo et al. |
| 9,624,402 | B2 | 4/2017 | Shimura et al. |
| 9,821,568 | B2 | 11/2017 | Shimura |
| 9,845,402 | B2 | 12/2017 | Shimura et al. |
| 2003/0220418 | A1 | 11/2003 | Horie |
| 2004/0063811 | A1 | 4/2004 | Horie et al. |
| 2004/0068031 | A1 | 4/2004 | Horie |
| 2004/0265756 | A1 | 12/2004 | Horie |
| 2005/0046675 | A1 | 3/2005 | Aoshima |
| 2005/0119363 | A1 * | 6/2005 | Yamada ................. C09D 11/36 522/71 |
| 2006/0189712 | A1 | 8/2006 | Kondo |
| 2007/0022904 | A1 | 2/2007 | Kitawaki et al. |
| 2008/0194754 | A1 | 8/2008 | Nakamura |
| 2009/0090271 | A1 | 4/2009 | Wynants et al. |
| 2009/0263632 | A1 | 10/2009 | Kojima et al. |
| 2010/0136234 | A1 | 6/2010 | Kobayashi |
| 2012/0006225 | A1 | 1/2012 | Tsukiana et al. |
| 2012/0048141 | A1 | 3/2012 | Arai et al. |
| 2018/0244936 | A1 | 8/2018 | Shimura et al. |
| 2018/0244937 | A1 | 8/2018 | Sugiura et al. |
| 2018/0244938 | A1 | 8/2018 | Morinaga et al. |
| 2018/0244939 | A1 | 8/2018 | Sugiura et al. |
| 2018/0244941 | A1 | 8/2018 | Sugiura et al. |
| 2018/0327617 | A1 * | 11/2018 | Inoue ..................... C09D 11/03 |
| 2019/0100002 | A1 | 4/2019 | Ozawa |
| 2019/0100668 | A1 | 4/2019 | Ando |
| 2019/0100671 | A1 | 4/2019 | Morinaga |
| 2019/0134989 | A1 | 5/2019 | Matsumoto et al. |
| 2019/0300737 | A1 | 10/2019 | Ozawa |
| 2020/0040206 | A1 | 2/2020 | Sugiura |

FOREIGN PATENT DOCUMENTS

| AU | 2012247077 B2 | 11/2012 |
| CN | 104610811 A | 5/2015 |
| CN | 106084984 A | 11/2016 |
| EP | 1493783 A1 | 1/2005 |

(Continued)

OTHER PUBLICATIONS

English translation of JP 2004/217703, Aug. 2004; 9 pages.*
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.

(Continued)

*Primary Examiner* — Helene Klemanski

(74) *Attorney, Agent, or Firm* — Greenblum & Bernstein, P.L.C.

(57) ABSTRACT

An oil-based inkjet ink is disclosed, the oil-based inkjet ink containing a pigment, a pigment dispersant and a non-aqueous solvent, wherein the pigment contains an acidic carbon black having a pH of 2 to 6, the non-aqueous solvent contains a modified silicone oil having a surface tension of not more than 27 mN/m, and an amount of the modified silicone oil, relative to a total mass of the oil-based inkjet ink, is at least 15% by mass but not more than 80% by mass.

4 Claims, No Drawings

(56) References Cited

FOREIGN PATENT DOCUMENTS

| | | | |
|---|---|---|---|
| EP | 3093316 | A1 | 11/2016 |
| EP | 3 366 737 | | 8/2018 |
| EP | 3 366 739 | | 8/2018 |
| EP | 3366733 | | 8/2018 |
| EP | 3461868 | | 4/2019 |
| JP | 01203482 | A | 8/1989 |
| JP | H03-292370 | A | 12/1991 |
| JP | H04-161467 | A | 6/1992 |
| JP | H04-248879 | A | 9/1992 |
| JP | 2001-098196 | A | 4/2001 |
| JP | 2001-342388 | | 12/2001 |
| JP | 2004-217703 | A | 8/2004 |
| JP | 2005-60567 | A | 3/2005 |
| JP | 2006-307107 | A | 11/2006 |
| JP | 2006-315363 | A | 11/2006 |
| JP | 2007-154149 | A | 6/2007 |
| JP | 2010001452 | | 1/2010 |
| JP | 2010/064478 | | 3/2010 |
| JP | 2014-19766 | A | 2/2014 |
| JP | 2016-196564 | A | 11/2016 |

OTHER PUBLICATIONS

European Search Report issued with respect to Application No. 18158573.8, dated Jul. 18, 2018.
Jan. 11, 2019 Office Action in copending U.S. Appl. No. 15/904,496, filed Feb. 26, 2018.
European Search Report issued with respect to Application No. 18158552.2, dated May 17, 2018.
Official Communication issued in European Patent Office (EPO) Patent Application No. 18 158 557.1, dated Sep. 5, 2019.
Office Action in U.S. Appl. No. 15/904,496 dated Sep. 21, 2018.
English translation of JP 2006/307107, Nov. 2006; 28 pages.
English translation of JP 2016/196564, Nov. 2016; 29 pages.
English translation of JP 2001/098196, Apr. 2001; 12 pages.
English translation of JPH 03/292370, Dec. 1991; 6 pages.
Reactive and Non-Reactive Silicone Fluid from Shin-Etsu Chemical Co. Ltd., shinetsusilicone-global.com/catalog/pdf/modified_e.pdf; 2006; 10 pages.
"Phenyl Methyl Silicon Fluid" www.organosilicon.com/en/68083-14-7.htm, no date available; 1 page.
Mar. 11, 2020 Office Action in copending U.S. Appl. No. 15/904,478, filed Feb. 26, 2018.
English translation of JP-01203482-A, Aug. 1989; 6 pages.
Apr. 7, 2020 Office Action in copending U.S. Appl. No. 15/904,476, filed Feb. 26, 2018.
"Silicone Fluid KF-96" from Shin-Etsu Chemical Co., Ltd.; shinetsusilicone-global.com/catalog/pdf/kf96_e.pdf. 2004; 36 pages.
Apr. 9, 2020 Office Action in copending U.S. Appl. No. 15/904,481, filed Feb. 26, 2018.
Apr. 13, 2020 Office Action in copending U.S. Appl. No. 15/904,508, filed Feb. 26, 2018.
Apr. 15, 2020 Office Action in copending U.S. Appl. No. 16/141,054, filed Sep. 25, 2018.
Extended European Search Report from European Patent Office (EPO) in European Patent Appl. No. 18192237.8, dated Mar. 14, 2019.
English translation of JPH 04/248879, Sep. 1992; 13 pages.
Apr. 15, 2020 Office Action in copending U.S. Appl. No. 16/141,003, filed Sep. 25, 2018.
English translation of JP 2010/064478, Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.
Catalogue of Organic Modified Silicone, Dow Corning Toray Co., Ltd., in Japanese, with English Translation of p. 10 (2016).
"Silicon Compounds: Silanes and Silicones," *GELEST, A Survey of Properties and Chemistry*, $3^{rd}$ Edition, edited by Barry Arkles & Gerald L. Larson, Gelest, Inc. Morrisville, PA, 608 pages (2013).
Official Action dated Aug. 5, 2020 in the counterpart Chinese application No. 201810159232.X with translation.
Latest Practical Manual of Printing Technology, Letterpress Printing Technology Bulletin, Guangzhou, Tibet, p. 119, Hefei: Anhui Audio-Visual Publishing House, Nov. 2003. See #1, the English translation of Sipo's Office Action at pp. 4-5 as a concise explanation of pertinence of this non-patent literature.
"Silicone Production and Application Technology", Institute of Scientific and Technological Information, Ministry of Chemical Industry, p. 86 Institute of Scientific and Technological Information, Ministry of Chemical Industry, Dec. 1985. See #1, the English translation of SIPO's Office Action at pp. 4-5 as a concise explanation of pertinence of this non-patent literature.
"Modern Fine Chemical Technology and Product Synthesis Processes", Kwong Shenglu, pp. 273-274, Beijing: Science and Technology Literature Publishing House, Dec. 1997. See #1, the English translation of SIPO's Office Action at pp. 4-5 as a concise explanation of pertinence of this non-patent literature.

* cited by examiner

OIL-BASED INKJET INK

CROSS REFERENCE TO RELATED APPLICATIONS

This application is based upon and claims the benefit of priority from the prior Japanese Patent Application No. 2017-35942, filed on Feb. 28, 2017, the entire contents of which are incorporated by reference herein, and the prior Japanese Patent Application No. 2017-188389, filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Oil-based inkjet inks include inks that use a carbon black as the colorant.

JP H04-161467 A proposes that by using an inkjet printer ink containing a pigment, a resin, and an insulating solvent having a siloxane linkage in the molecular skeleton, high-density vivid printing is possible, the printed image has favorable rub fastness, and stable discharge can be achieved, and also discloses inks that use an aniline black or carbon black as the pigment.

JP 2016-196564 A proposes that by using a non-aqueous inkjet ink composition containing a pigment, a non-aqueous solvent and a surfactant, wherein the surfactant contains a siloxane-based surfactant having an HLB value of at least 1.0 but not more than 7.0, the optical density of the image, and the discharge stability and storage stability of the ink can all be improved, and also discloses inks that use a carbon black as the pigment.

JP 2004-217703 A proposes that by using an inkjet non-aqueous pigment ink containing a silicone-based solvent, a pigment, and a specific modified silicone oil as a dispersant, problems of ink stability, nozzle blockages and clear file deformation can all be improved, and also discloses inks that use a carbon black as the pigment.

SUMMARY OF THE INVENTION

An embodiment of the present invention provides an oil-based inkjet ink containing a pigment, a pigment dispersant and a non-aqueous solvent, wherein the pigment contains an acidic carbon black having a pH of 2 to 6, the non-aqueous solvent contains a modified silicone oil having a surface tension of not more than 27 mN/m, and the amount of the modified silicone oil, relative to the total mass of the ink, is at least 15% by mass but not more than 80% by mass.

DETAILED DESCRIPTION OF THE EMBODIMENTS

Embodiments of the present invention are described below, but the following embodiments in no way limit the present invention.

In oil-based inks, high image density can usually be achieved by using a carbon black having a small primary particle size and a large structure. Further, in oil-based inks, by using an acidic carbon black, favorable storage stability can usually be achieved even for carbon blacks having a small primary particle size and a large structure. However, as the pigment concentration in the ink increases, the storage stability of the ink tends to deteriorate.

On the other hand, inkjet printers form an image on a recording medium by discharging ink droplets from a nozzle plate. In order to ensure that ink or the like does not adhere to the nozzle plate, the nozzle plate is usually coated with a cured film formed from a fluororesin or the like, but it is impossible to completely prevent the adhesion of contaminants or foreign matter or the like. As a result, the nozzle plate is usually subjected to periodic cleaning. The most commonly employed cleaning method is a method in which the nozzle plate is wiped with a blade. However, repeated wiping causes any pigment or the like such as carbon black that has adhered to the nozzle plate to abrade the cured film on the nozzle plate, which can cause a deterioration in the durability of the cured film relative to wiping (hereafter termed "wiping resistance") that may lead to ink discharge faults.

An object of the present invention is to provide an oil-based inkjet ink that exhibits excellent storage stability and wiping resistance.

In the following description, the oil-based inkjet ink is sometimes referred to as simply "the ink".

The oil-based inkjet ink according to one embodiment contains a pigment, a pigment dispersant and a non-aqueous solvent, wherein the pigment contains an acidic carbon black having a pH of 2 to 6, the non-aqueous solvent contains a modified silicone oil having a surface tension of not more than 27 mN/m (hereafter sometimes referred to as "the modified silicone oil A"), and the amount of the modified silicone oil A, relative to the total mass of the ink, is at least 15% by mass but not more than 80% by mass.

This oil-based inkjet ink may exhibit excellent storage stability and may improve the wiping resistance.

Increasing the pigment concentration in an ink is one technique that is used to improve the optical density. However, increasing the pigment concentration tends to cause a deterioration in the ink storage stability.

Further, acidic carbon blacks tend to make it easier to achieve more favorable ink storage stability, but in the case of inks that use an acidic carbon black, when nozzle plate cleaning is performed, the surface of the nozzle plate tends to be more easily damaged, and the wiping resistance tends to deteriorate more readily. It is thought that this is because acidic carbon blacks exhibit a higher affinity with the nozzle plate, and are therefore more likely to adhere to the nozzle plate. Further, it is thought that the strength of the affinity between the acidic carbon black and the nozzle plate is dependent on the number of acidic functional groups on the surface of the carbon black.

Although not constrained by this particular theory, it is thought that by using the modified silicone oil A with a low surface tension of 27 mN/m or less, wetting of the pigment improves and the dispersion efficiency can be improved, resulting in an improvement in the ink storage stability. Further, it is thought that the efficiency of adsorption of the pigment dispersant also improves, meaning the acidic functional groups on the surface of the acidic carbon black can be efficiently protected by the pigment dispersant, resulting in an improvement in the wiping resistance.

The ink preferably contains a pigment as a colorant.

Further, in the ink, the pigment preferably contains an acidic carbon black having a pH of 2 to 6.

By using an acidic carbon black having a pH of 2 to 6 as the carbon black, the storage stability of the ink can be more easily improved. It is thought that this is because acidic carbon blacks have acidic functional groups on the pigment surface, and therefore interact more readily with the pigment dispersant, resulting in superior dispersibility compared with, for example, neutral carbon blacks.

There are no particular limitations on the acidic carbon black, provided the pH is within a range from 2 to 6, and any of a furnace carbon black, lamp black, acetylene black, or channel black or the like may be used.

The pH of the acidic carbon black is preferably at least 2, and may be 2.5 or higher. From the viewpoint of achieving favorable ink storage stability, the pH of the carbon black is preferably not more than 6, more preferably not more than 5.5, and may be 5.0 or less.

The pH of the carbon black refers to the value obtained by measuring the pH of a mixed liquid containing the carbon black and distilled water in accordance with JIS K5101.

Specific examples of commercially available acidic carbon blacks include MA7, MA8, MA77, MA100, MA11, MA230, MA14, MA220, #1000, #970, #2350 and #2650 manufactured by Mitsubishi Chemical Corporation, and Special Black 350, Special Black 550, Special Black 4, Special Black 5, Special Black 6, Colour Black S160, Colour Black S170, Colour Black FW18 and Printex 140 manufactured by Orion Engineered Carbons LLC.

A single acidic carbon black having a pH of 2 to 6 may be used alone, or a combination of two or more such carbon blacks may be used.

From the viewpoint of the print density, the amount of the acidic carbon black having a pH of 2 to 6 in the ink, relative to the total mass of the ink, is preferably at least 0.01% by mass, more preferably at least 1% by mass, even more preferably at least 3% by mass, and even more preferably 5% by mass or greater. Further, from the viewpoint of the ink viscosity, the amount of the acidic carbon black having a pH of 2 to 6 in the ink, relative to the total mass of the ink, is preferably not more than 20% by mass, more preferably not more than 15% by mass, and even more preferably 10% by mass or less.

The ink may also contain another pigment, together with the acidic carbon black having a pH of 2 to 6, as the colorant.

Examples of this other pigment include organic pigments such as azo pigments, phthalocyanine pigments, polycyclic pigments and dye lake pigments, and inorganic pigments such as carbon blacks other than acidic carbon blacks having a pH of 2 to 6, and metal oxides. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the metal oxides include titanium oxide and zinc oxide. These other pigments may be used individually, or a combination of two or more pigments may be used.

The dispersed form of the pigment may be a dispersion in which a so-called encapsulated pigment in which the pigment is coated with an oil-insoluble resin, or colored resin particles, are dispersed using a pigment dispersant, but a dispersion in which a pigment dispersant is adsorbed directly to the pigment surface is preferred.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass relative to the total mass of the ink, and from the viewpoint of the print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multi-chain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant is typically added in a mass ratio within a range from 0.1 to 5, and preferably from 0.1 to 1, relative to a value of 1 for the pigment. Further, the pigment dispersant is typically added in an amount of 0.01 to 10% by mass, and preferably from 0.01 to 5% by mass, relative to the total mass of the ink.

In the oil-based ink, the amount of resin components, including the pigment dispersant, relative to the total mass of the ink, is typically not more than 10% by mass, more preferably not more than 7% by mass, and even more preferably 5% by mass or less. This can prevent any increase in the ink viscosity, and improve the discharge performance.

The ink may contain a modified silicone oil having a surface tension of not more than 27 mN/m (the modified silicone oil A).

From the viewpoints of improving the storage stability and wiping resistance, the surface tension of the modified silicone oil A is preferably not more than 27 mN/m, and is more preferably less than 27 mN/m, even more preferably 26 mN/m or less, and even more preferably less than 25 mN/m. The surface tension of the modified silicone oil A may be, for example, typically at least 15 mN/m, and may be 17 mN/m or greater, or 20 mN/m or greater.

The surface tension can be determined by the maximum bubble pressure method. For example, the surface tension can be measured using the Science Line t60 device manufactured by SITA Process Solutions of SITA Messtechnik GmbH.

The modified silicone oil A is preferably a compound that is liquid at 23° C.

Examples of compounds that may be used as the modified silicone oil include silicone oils obtained by introducing any of various organic groups at a portion of the silicon atoms of a chain-like or cyclic dimethyl silicone oil. In the modified silicone oil, it is preferable that all of the silicon atoms are bonded only to carbon atoms or oxygen atoms of siloxane linkages. The modified silicone oil is preferably an unreactive silicone oil. The modified silicone oil is preferably composed only of silicon atoms, carbon atoms, oxygen atoms and hydrogen atoms.

Examples of compounds that can be used as the modified silicone oil include compounds in which at least one methyl group contained within a chain-like or cyclic dimethyl silicone oil has been substituted with one or more groups selected from the group consisting of alkyl groups, carboxylate ester linkage-containing groups, aromatic ring-containing groups, and ether linkage-containing groups.

Examples of other compounds that can be used as the modified silicone oil include compounds in which at least one silicon atom contained in a chain-like or cyclic dimethyl silicone oil has been bonded, via an alkylene group, to a silicon atom of another chain-like or cyclic dimethyl silicone oil. In this case, at least one methyl group contained within the chain-like or cyclic dimethyl silicone oils that are linked via the alkylene group may be substituted with one or more groups selected from the group consisting of alkyl groups, carboxylate ester linkage-containing groups, aromatic ring-containing groups, and ether linkage-containing groups.

Examples of these modified silicone oils include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

The modified silicone oil preferably contains 2 to 20 silicon atoms, more preferably 2 to 10 silicon atoms, even more preferably 2 to 6 silicon atoms, and most preferably 3 to 6 silicon atoms.

Examples of the organic groups that may be introduced into the modified silicone oil include those groups mentioned below in the description of general formula (X) as examples of monovalent organic groups in which the total number of carbon atoms and oxygen atoms is at least 2 for $R^2$, or as examples of divalent organic groups for $R^1$.

Examples of compounds that can be used as phenyl-modified silicone oils include methyl phenyl silicones such as trimethylsiloxyphenyl dimethicone, phenyl trimethicone, diphenylsiloxyphenyl trimethicone, and 1,1,1,5,5,5-hexamethyl-3-phenyl-3-(trimethylsilyloxy)trisiloxane.

Examples of the modified silicone oil include silicone oils represented by general formula (X) shown below.

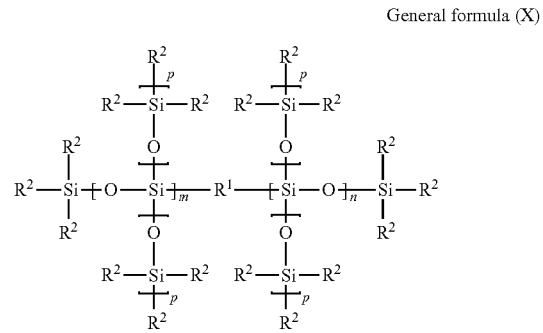

General formula (X)

In general formula (X), $R^1$ represents an oxygen atom or a divalent organic group, each $R^2$ independently represents a methyl group or a monovalent organic group in which the total number of carbon atoms and oxygen atoms is at least 2, each of m and n independently represents an integer of at least 0 (and preferably 0 to 4), each p independently represents an integer of at least 0 (and preferably 0 to 2), the total number of silicon atoms within one molecule is from 2 to 20 (and preferably from 2 to 10, more preferably from 2 to 6, and even more preferably from 3 to 6), and when m+n=0, $R^1$ is an oxygen atom and at least one $R^2$ is a monovalent organic group in which the total number of carbon atoms and oxygen atoms is at least 2, and when $R^1$ is a divalent organic group, m+n≥1.

In general formula (X), examples of the monovalent organic group in which the total number of carbon atoms and oxygen atoms is at least 2 include alkyl groups having at least 2 carbon atoms, carboxylate ester linkage-containing groups, aromatic ring-containing groups, and ether linkage-containing groups. Examples of the divalent organic group in general formula (X) include alkylene groups.

The alkyl group having at least 2 carbon atoms may have a straight chain or branched chain, and may be either a chain-like or alicyclic group. The alkyl group having at least two carbon atoms preferably has 2 to 20 carbon atoms, and more preferably 4 to 20 carbon atoms. Examples of the alkyl group having at least 2 carbon atoms include an ethyl group, propyl group, isopropyl group, n-butyl group, isobutyl group, tert-butyl group, pentyl group, hexyl group, heptyl group, octyl group, isooctyl group, nonyl group, decyl group, dodecyl group, tetradecyl group, hexadecyl group and eicosyl group.

Examples of the carboxylate ester linkage-containing group include the same groups as those listed below as examples of the carboxylate ester linkage-containing group in a modified silicone oil S described below.

Examples of the aromatic ring-containing group include the same groups as those listed below as examples of the aromatic ring-containing group in the modified silicone oil S described below.

The alkylene group may have a straight chain or a branched chain, and may be chain-like or alicyclic. The alkylene group preferably has 1 to 20 carbon atoms, and more preferably 4 to 20 carbon atoms. Examples of the alkylene group include a methylene group, ethylene group, propylene group, trimethylene group, n-butylene group, isobutylene group, pentylene group, hexylene group, heptylene group, octylene group, isooctylene group, nonylene group, decylene group, dodecylene group, hexadecylene group and eicosylene group.

Examples of the modified silicone oil include silicone oils represented by general formula (Y) shown below.

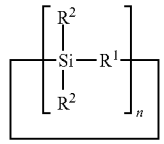

General formula (Y)

In general formula (Y), each $R^1$ independently represents an oxygen atom or a divalent organic group, each $R^2$ independently represents a methyl group or a monovalent organic group in which the total number of carbon atoms and oxygen atoms is at least 2, n represents an integer of 5 or greater, the total number of silicon atoms within one molecule is from 5 to 9, at least one $R^1$ represents an oxygen atom, and when all the $R^1$ groups are oxygen atoms, at least one $R^2$ represents a monovalent organic group in which the total number of carbon atoms and oxygen atoms is at least 2.

In general formula (Y), examples of the monovalent organic group in which the total number of carbon atoms and oxygen atoms is at least 2 include the same groups as those listed above for the monovalent organic group in which the total number of carbon atoms and oxygen atoms is at least 2 in general formula (X). Examples of the divalent organic group in general formula (Y) include the same groups as those listed above for the divalent organic group in general formula (X).

In both general formula (X) and general formula (Y), the total number of divalent organic groups and monovalent organic groups in which the total number of carbon atoms and oxygen atoms is at least 2 is preferably not more than 3, more preferably not more than 2, and is most preferably 1.

Examples of the modified silicone oil include a silicone oil having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. Hereafter, this silicone oil is sometimes referred to as "the modified silicone oil S".

The modified silicone oil S may contain at least one group selected from the group consisting of groups (A) to (D) described below as the organic group in which the total number of carbon atoms and oxygen atoms is at least 4.

(A) Alkyl groups having at least 4 carbon atoms.
(B) Carboxylate ester linkage-containing groups in which the total number of carbon atoms and oxygen atoms is at least 4.
(C) Aromatic ring-containing groups having at least 6 carbon atoms.
(D) Alkylene groups having at least 4 carbon atoms.

In the modified silicone oil S, the total number of carbon atoms and oxygen atoms contained in all of the organic groups in which the total number of carbon atoms and oxygen atoms is at least 4 is preferably 4 or greater in one molecule, and is more preferably 8 or greater, and even more preferably 10 or greater, in one molecule.

In the modified silicone oil S, the total number of carbon atoms and oxygen atoms contained in all of the organic groups in which the total number of carbon atoms and oxygen atoms is at least 4 is preferably not more than 20 in one molecule, and is more preferably not more than 16, and even more preferably 12 or fewer, in one molecule.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups each having a total number of carbon atoms and oxygen atoms of at least 4.

It is preferable that the modified silicone oil S has a total number of carbon atoms and oxygen atoms, contained within all of the organic groups in which the total number of carbon atoms and oxygen atoms is at least 4, that is from 4 to 12 within one molecule.

It is preferable that the modified silicone oil S has a total number of carbon atoms and oxygen atoms, contained within all of the organic groups in which the total number of carbon atoms and oxygen atoms is at least 4, that is from 8 to 20 within one molecule.

Examples of the modified silicone oil S include a silicone oil of the above general formula (X) in which $R^1$ represents an oxygen atom or a divalent organic group which has a carbon atom bonded directly to a silicon atoms and in which the total number of carbon atoms and oxygen atoms is at least 4, each $R^2$ independently represents a methyl group or a monovalent organic group which has a carbon atom bonded directly to a silicon atom and in which the total number of carbon atoms and oxygen atoms is at least 4, each of m and n independently represents an integer of 0 to 4, each p independently represents an integer of 0 to 2, the number of silicon atoms in one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule, and when m+n=0, $R^1$ is an oxygen atom, and when $R^1$ is a divalent organic group in which the total number of carbon atoms and oxygen atoms is at least 2, m+n≥1.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the modified silicone oil S include silicone oils represented by general formula (X-1) shown below.

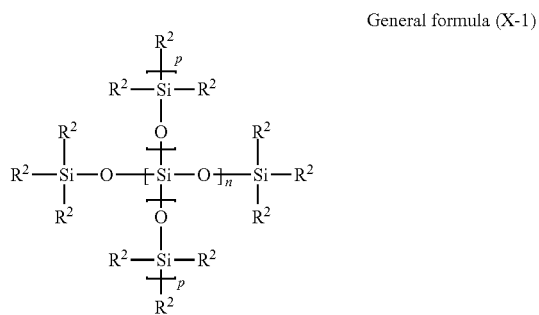

General formula (X-1)

In general formula (X-1), each $R^2$ independently represents a methyl group or a monovalent organic group which has a carbon atom bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that at least one $R^2$ is selected from the group consisting of alkyl groups having at least 4 carbon atoms, carboxylate ester linkage-containing groups in which the total number of carbon atoms and oxygen atoms is at least 4, and aromatic ring-containing groups having at least 6 carbon atoms.

In the modified silicone oil S, the alkyl group having at least 4 carbon atoms may have a straight chain or a branched chain, and may be chain-like or alicyclic. The alkyl group having at least 4 carbon atoms preferably has 4 to 20 carbon atoms.

The number of carbon atoms in the alkyl group is preferably at least 4, more preferably at least 8, and even more preferably 10 or greater.

The number of carbon atoms in the alkyl group is preferably not more than 20, more preferably not more than 16, and even more preferably 12 or fewer.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, tetradecyl group, hexadecyl group and eicosyl group.

Preferred groups include an octyl group, decyl group, dodecyl group, tetradecyl group and hexadecyl group, and a decyl group or dodecyl group is more preferred.

In the modified silicone oil S, for the carboxylate ester linkage-containing group, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be preferably used.

Here, $R^{Ba}$ is preferably a chain-like or alicyclic alkyl group having at least 1 carbon atom which may have a straight chain or branched chain. $R^{Bb}$ is preferably a chain-like or alicyclic alkylene group having at least 1 carbon atom which may have a straight chain or branched chain. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is more preferred.

In the carboxylate ester linkage-containing group, the alkylene group ($R^{Bb}$) is preferably a linear alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group. An ethylene group is preferred.

In the modified silicone oil S, for the aromatic ring-containing group, a group represented by —$R^{Ca}$ in which the aromatic ring is bonded directly to a silicon atom of the main-chain siloxane linkage, or a group represented by —$R^{Cb}$—$R^{Ca}$, in which the aromatic ring is bonded to a silicon atom of the main-chain siloxane linkage via an alkylene group, can be used favorably.

Here, $R^{Ca}$ is preferably an aromatic ring having at least 6 carbon atoms. $R^{Cb}$ is preferably a chain-like or alicyclic alkylene group having at least 1 carbon atom which may have a straight chain or branched chain.

When the aromatic ring-containing group is a group represented by —$R^{Ca}$ in which the aromatic ring is bonded directly to a silicon atom of the main-chain siloxane linkage, it is preferable that a branched chain such as a trimethylsilyloxy group branches from the main-chain siloxane linkage as a side chain. It is more preferable that the aromatic ring-containing group is a group represented by —$R^{Cb}$—$R^{Ca}$, in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

The aromatic ring-containing group may contain one, or two or more aromatic rings, but the total number of carbon atoms in all of the aromatic ring-containing groups of at least 6 carbon atoms in one molecule is preferably from 6 to 20.

In the aromatic ring-containing group, the optional alkylene group ($R^{Cb}$) is preferably an alkylene group having 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

In the modified silicone oil S, the alkylene group having at least 4 carbon atoms may have a straight chain or a branched chain, and may be chain-like or alicyclic. The alkylene group having at least 4 carbon atoms preferably has 4 to 20 carbon atoms.

The number of carbon atoms in the alkylene group is preferably at least 4, and more preferably 8 or greater.

The number of carbon atoms in the alkylene group is preferably not more than 20, more preferably not more than 12, and even more preferably 10 or fewer.

Embodiments of the modified silicone oil S includes compounds in which the carbon atom at one terminal of an alkylene group having at least 4 carbon atoms is bonded to a siloxane linkage, and the carbon atom at the other terminal is bonded to either a siloxane linkage or a silyl group.

Examples of the alkylene group having at least 4 carbon atoms include an n-butylene group, isobutylene group, pentylene group, hexylene group, heptylene group, octylene group, isooctylene group, nonylene group, decylene group, dodecylene group, hexadecylene group and eicosylene group. An octylene group, decylene group or dodecylene group is preferred, and an octylene group or decylene group is more preferred.

The modified silicone oil S described above can be produced using the method described below, but the invention is not restricted to this particular method.

For example, the modified silicone oil S can be obtained by reacting a siloxane raw material with a reactive compound having both an organic group in which the total number of carbon atoms and oxygen atoms is at least 4 and a reactive group, in an organic solvent. The siloxane raw material and the reactive compound are preferably reacted so that the molar ratio between the reactive group of the siloxane raw material and the reactive group of the reactive compound is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

Examples of compounds that can be used as the siloxane raw material include 1,1,3,3-tetramethyldisiloxane, 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

The reactive compound preferably contains a carbon double bond as the reactive group.

Examples of reactive compounds that can be used for introducing an alkyl group into the modified silicone oil S include alkenes having at least 4 carbon atoms, such as 1-butene, 2-butene, 1-pentene, 1-hexene, 1-heptene, 1-octene, 2-octene, 1-nonene, 1-decene, 1-dodecene, 1-tetradecene, 1-hexadecene and 1-eicosene. Further, besides alkenes, alicyclic hydrocarbons having an ethylenic unsaturated double bond such as vinylcyclohexane can also be used.

Examples of reactive compounds that can be used for introducing a carboxylate ester linkage-containing group into the modified silicone oil S include vinyl esters of aliphatic acids and allyl esters of aliphatic acids in which the total number of carbon atoms and oxygen atoms is at least 6, such as vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate and allyl hexanoate.

Examples of reactive compounds that can be used for introducing an aromatic ring-containing group into the modified silicone oil S include aryl compounds having a vinyl bond and an aromatic ring of at least 6 carbon atoms, such as styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, trans-β-methylstyrene, and 3-phenyl-1-propene.

Examples of reactive compounds that can be used for introducing an alkylene group into the modified silicone oil S include diene compounds having at least 4 carbon atoms, such as 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the modified silicone oil A, and examples of products that may be used include KF-56A (diphenylsiloxyphenyl trimethicone) manufactured by Shin-Etsu Chemical Co., Ltd., SS-3408 (caprylyl methicone) manufactured by Dow Corning Toray Co., Ltd., TSF410 and TSF411 manufactured by Momentive Performance Materials Inc., and phenethyltris(trimethylsiloxy)silane and 3-phenylheptamethyltrisiloxane manufactured by Gelest, Inc.

A single modified silicone oil A may be used alone, or a combination of a plurality of modified silicone oils may be used.

From the viewpoint of improving the wiping resistance, the amount of the modified silicone oil A in the ink, relative to the total mass of the ink, is preferably at least 15% by mass, more preferably at least 20% by mass, and even more preferably 25% by mass or greater. This ensures satisfactory wetting of the pigment, and can accelerate dispersion of the pigment and improve the wiping resistance.

Further, from the viewpoints of controlling the wettability of the nozzle plate and improving the wiping resistance, the amount of the modified silicone oil A in the ink, relative to the total mass of the ink, is preferably not more than 80% by mass, more preferably less than 80% by mass, even more preferably not more than 75% by mass, and even more preferably 70% by mass or less.

The ink may contain one or more other non-aqueous solvents.

Both non-polar organic solvents and polar organic solvents can be used as these other non-aqueous solvents. In the embodiments of the present invention, a water-insoluble organic solvent that does not mix uniformly with an equal volume of water at 1 atmosphere and 20° C. is preferably used as the non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of polar organic solvents that can be used favorably include fatty acid ester-based solvents, higher alcohol-based solvents and higher fatty acid-based solvents.

Specific examples include fatty acid ester-based solvents having at least 13 carbon atoms, and preferably 16 to 30 carbon atoms, within one molecule, such as isononyl isononanoate, isodecyl isononanoate, isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, methyl soybean oil, isobutyl soybean oil, methyl tallate and isobutyl tallate;

higher alcohol-based solvents having at least 6 carbon atoms, and preferably 12 to 20 carbon atoms, within one molecule, such as isomyristyl alcohol, isopalmityl alcohol, isostearyl alcohol, oleyl alcohol, isoeicosyl alcohol and decyltetradecanol; and higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid.

The boiling point of these polar organic solvents such as the fatty acid ester-based solvents, higher alcohol-based solvents and higher fatty acid-based solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

The amount of the modified silicone oil A in the ink, relative to the total mass of the non-aqueous solvent in the ink, is preferably at least 20% by mass, and more preferably 25% by mass or greater. The amount of the modified silicone oil A in the ink, relative to the total mass of the non-aqueous solvent in the ink, may be, for example, not more than 90% by mass, or 80% by mass or less.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and even more preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the present invention is preferably discharged from the inkjet head based on a digital signal, with the discharged ink droplets being adhered to a recording medium.

In the embodiments of the present invention, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several μm to several tens of μm are formed with a spacing between fibers of several tens to several hundred μm, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.
<Synthesis of Modified Silicone Oils>
A four-necked flask was charged with 50 parts by mass of hexane, 10 parts by mass of 1,1,1,3,5,5,5-heptamethyltrisiloxane, and 9.6 parts by mass of 1-tetradecene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain a solvent A (tetradecyl methicone). The solvent A (tetradecyl methicone) was a compound that had been modified with a tetradecyl group.

With the exception of mixing a siloxane raw material and a reactive compound in the formulation shown in Table 1, a solvent B (dioctyldisiloxane) was synthesized in a similar manner to above. The solvent B (dioctyldisiloxane) was a compound that had been modified with two octyl groups.

In the synthesis of the solvent A (tetradecyl methicone), mixing was performed so that the molar ratio between the siloxane compound and the reactive compound was 1:1.1. In the synthesis of the solvent B (dioctyldisiloxane), mixing was performed so that the molar ratio between the siloxane compound and the reactive compound was 1:2.2.

The 1,1,1,3,5,5,5-heptamethyltrisiloxane, the 1,1,3,3-tetramethyldisiloxane and the reactive compounds shown in Table 1 can be obtained from Tokyo Chemical Industry Co., Ltd.

TABLE 1

|  | Siloxane raw material Raw material | (parts by mass) Amount | Reactive compound Raw material | (parts by mass) Amount |
|---|---|---|---|---|
| Solvent A | 1,1,1,3,5,5,5-heptamethyltrisiloxane | 10 | 1-tetradecene | 9.6 |
| Solvent B | 1,1,3,3-tetramethyldisiloxane | 10 | 1-octene | 16.7 |

<Preparation of Inks>
Ink formulations are shown in Table 2, Table 3 and Table 4. The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The materials used were as follows.
(1) Carbon Blacks
MA77: manufactured by Mitsubishi Chemical Corporation (pH 2.5)
FW18: Colour Black FW18, manufactured by Orion Engineered Carbons LLC (pH 2.5)
MA230: manufactured by Mitsubishi Chemical Corporation (pH 3.0)
S160: Colour Black S160, manufactured by Orion Engineered Carbons LLC (pH 3.0)
S170: Colour Black S170, manufactured by Orion Engineered Carbons LLC (pH 4.5)
2600: manufactured by Mitsubishi Chemical Corporation (pH 6.5)
(2) Pigment Dispersants
S13940: Solsperse 13940, a polyester amine-based dispersant, manufactured by The Lubrizol Corporation, effective component: 40% by mass
S16000: Solsperse 16000, a fatty acid amine-based dispersant, manufactured by The Lubrizol Corporation, effective component: 100% by mass
(3) Non-Aqueous Solvents
(3-1) Silicone Oils
KF-96L-5cs: a dimethylpolysiloxane, a chain-like silicone oil, manufactured by Shin-Etsu Chemical Co., Ltd., surface tension: 19.7 mN/m
DC246 fluid: dodecamethylcyclohexasiloxane, a cyclic silicone oil, manufactured by Dow Corning Toray Co., Ltd., surface tension: 18.8 mN/m
(3-2) Modified Silicone Oils
HIVAC f-4: 1,3,3,5-tetramethyl-1,1,5,5-tetraphenyltrisiloxane, a phenyl-modified silicone oil, manufactured by Shin-Etsu Chemical Co., Ltd., surface tension: 33.9 mN/m
KF-56A: diphenylsiloxyphenyl trimethicone, a phenyl-modified silicone oil, manufactured by Shin-Etsu Chemical Co., Ltd., surface tension: 24.4 mN/m
SS-3408: caprylyl methicone, an alkyl-modified silicone oil, manufactured by Dow Corning Toray Co., Ltd., surface tension: 20.3 mN/m
Solvent A: tetradecyl methicone, an alkyl-modified silicone oil manufactured using the method described above, surface tension: 22.9 mN/m
Solvent B: dioctyldisiloxane, an alkyl-modified silicone oil manufactured using the method described above, surface tension: 24.0 mN/m
TSF410: a carboxylate ester-modified silicone oil, manufactured by Momentive Performance Materials Inc., surface tension: 23.0 mN/m
TSF411: a carboxylate ester-modified silicone oil, manufactured by Momentive Performance Materials Inc., surface tension: 26.0 mN/m
(3-3) Non-Aqueous Solvent
KAK139: isotridecyl isononanoate, manufactured by Kokyu Alcohol Kogyo Co., Ltd., surface tension: 29.3 mN/m The pH values for the carbon blacks were determined in accordance with JIS K5101.
The surface tension of each solvent was determined using a Science Line t60 device manufactured by SITA Process Solutions of SITA Messtechnik GmbH, under measurement conditions of 23° C. and 0.05 Hz.

<Evaluations>

The inks of the examples and comparative examples described above were each evaluated using the methods described below. The results of these evaluations are shown in Tables 2 to 4.

(1) Ink Storage Stability (70° C.)

Each ink was placed in a sealed container and left to stand for four weeks in an environment at 70° C. The viscosity of the ink prior to this standing period (the initial viscosity) and the viscosity after the standing period (viscosity after 4 weeks) were measured, and the change in viscosity was determined using the formula below. Based on this change in viscosity, the storage stability was evaluated against the following evaluation criteria.

The ink viscosity refers to the viscosity at 23° C., and was measured using a "Rheometer MCR302" manufactured by Anton Paar Japan K.K. (cone angle: 1°, diameter: 50 mm).

Change in viscosity=[(viscosity after 4 weeks×100)/(initial viscosity)]−100(%)

(Evaluation Criteria)
A: change in viscosity of less than ±1%
B: change in viscosity of at least ±1% but less than ±2%
C: change in viscosity of at least ±2%

(2) Wiping Resistance Evaluation

Each ink was dripped onto the cured film of a nozzle plate, and a blade made of a fluororubber (Viton MV454 53°, manufactured by DuPont Dow Elastomers LLC) was wiped across the nozzle plate at a rate of 200 back and forth movements per minute. The surface of the nozzle plate was inspected visually after every 1,000 back and forth movements, and the number of repetitions completed before the nozzle plate surface begins to be wetted by the ink was counted. The contact force between the fluororubber and the nozzle plate was about $6 \times 10^{-2}$ N. The wetting of the nozzle plate surface by the ink means that damage has occurred to the cured film. A higher number of back and forth repetitions with the blade before the nozzle plate surface begins to be wetted by the ink indicates a higher level of wiping resistance. The wiping resistance was evaluated against the following evaluation criteria.

(Evaluation Criteria)
S: number of back and forth blade repetitions of at least 2,000
A: number of back and forth blade repetitions of at least 1,000 but less than 2,000
B: number of back and forth blade repetitions of less than 1,000

TABLE 2

| (% by mass) | | pH | Surface tension (mN/m) | Example 1 | Example 2 | Example 3 | Example 4 | Example 5 | Example 6 |
|---|---|---|---|---|---|---|---|---|---|
| Carbon blacks | MA77 | 2.5 | | 5 | 5 | 5 | | | |
| | FW18 | 2.5 | | | | | 5 | 5 | 5 |
| | MA230 | 3.0 | | | | | | | |
| | S160 | 3.0 | | | | | | | |
| | S170 | 4.5 | | | | | | | |
| | #2600 | 6.5 | | | | | | | |
| Pigment dispersants | S13940 | | | 5 | 5 | 5 | 5 | 5 | 5 |
| | S16000 | | | | | | | | |
| Silicone oils | KF-96L-5cs | | 19.7 | | | | | | |
| | DC246 fluid | | 18.8 | | | | | | |
| Modified silicone oils | HIVAC f-4 | | 33.9 | | | | | | |
| | KF-56A | | 24.4 | 25 | 40 | 75 | | | |
| | SS-3408 | | 20.3 | | | | 25 | 40 | 75 |
| | Solvent A | | 22.9 | | | | | | |
| | Solvent B | | 24.0 | | | | | | |
| | TSF410 | | 23.0 | | | | | | |
| | TSF411 | | 26.0 | | | | | | |
| Non-aqueous solvent | KAK139 | | 29.3 | 65 | 50 | 15 | 65 | 50 | 15 |
| Total (% by mass) | | | | 100 | 100 | 100 | 100 | 100 | 100 |
| Amount of solvent having surface tension of not more than 27 mN/m | | | | 25 | 40 | 75 | 25 | 40 | 75 |
| Storage stability | | | | A | A | A | A | A | A |
| Wiping resistance | | | | S | S | A | S | S | A |

TABLE 3

| (% by mass) | | pH | Surface tension (mN/m) | Example 7 | Example 8 | Example 9 | Example 10 | Example 11 | Example 12 | Example 13 |
|---|---|---|---|---|---|---|---|---|---|---|
| Carbon blacks | MA77 | 2.5 | | | | | | | | |
| | FW18 | 2.5 | | | | | | | | |
| | MA230 | 3.0 | | 5 | 10 | | | | | |
| | S160 | 3.0 | | | | 5 | 10 | | | |
| | S170 | 4.5 | | | | | | 5 | 5 | 10 |
| | #2600 | 6.5 | | | | | | | | |
| Pigments dispersant | S13940 | | | 5 | | 5 | | 5 | 5 | |
| | S16000 | | | | 5 | | 5 | | | 5 |

TABLE 3-continued

| (% by mass) | | pH | Surface tension (mN/m) | Example 7 | Example 8 | Example 9 | Example 10 | Example 11 | Example 12 | Example 13 |
|---|---|---|---|---|---|---|---|---|---|---|
| Silicone oils | KF-96L-5cs | | 19.7 | | | | | | | |
| | DC246 fluid | | 18.8 | | | | | | | |
| Modified silicone oils | HIVAC f-4 | | 33.9 | | | | | | | |
| | KF-56A | | 24.4 | | | | | | | |
| | SS-3408 | | 20.3 | | | | | | | |
| | Solvent A | | 22.9 | 25 | 40 | | | | | |
| | Solvent B | | 24.0 | | | 25 | 40 | | | |
| | TSF410 | | 23.0 | | | | | 25 | 40 | |
| | TSF411 | | 26.0 | | | | | | | 25 |
| Non-aqueous solvent | KAK139 | | 29.3 | 65 | 45 | 65 | 45 | 65 | 50 | 60 |
| Total (% by mass) | | | | 100 | 100 | 100 | 100 | 100 | 100 | 100 |
| Amount of solvent having surface tension of not more than 27 mN/m | | | | 25 | 40 | 25 | 40 | 25 | 40 | 25 |
| Storage stability | | | | A | A | A | A | A | A | A |
| Wiping resistance | | | | S | S | S | S | S | S | S |

TABLE 4

| (% by mass) | | pH | Surface tension (mN/m) | Comparative Example 1 | Comparative Example 2 | Comparative Example 3 | Comparative Example 4 | Comparative Example 5 | Comparative Example 6 |
|---|---|---|---|---|---|---|---|---|---|
| Carbon blacks | MA77 | 2.5 | | | | | | | |
| | FW18 | 2.5 | | | | | | | |
| | MA230 | 3.0 | | | | | 5 | 5 | 5 |
| | S160 | 3.0 | | 5 | 5 | | | | |
| | S170 | 4.5 | | | | | | | |
| | #2600 | 6.5 | | | | 5 | | | |
| Pigment dispersants | S13940 | | | | | | 5 | 5 | 5 |
| | S16000 | | | 5 | 5 | 5 | | | |
| Silicone oils | KF-96L-5cs | | 19.7 | | | | 25 | | |
| | DC246 fluid | | 18.8 | | | | | 25 | |
| Modified silicone oils | HIVAC f-4 | | 33.9 | | | | | | 25 |
| | KF-56A | | 24.4 | | | | | | |
| | SS-3408 | | 20.3 | 5 | 90 | 25 | | | |
| | Solvent A | | 22.9 | | | | | | |
| | Solvent B | | 24.0 | | | | | | |
| | TSF410 | | 23.0 | | | | | | |
| | TSF411 | | 26.0 | | | | | | |
| Non-aqueous solvent | KAK139 | | 29.3 | 85 | | 65 | 65 | 65 | 65 |
| Total (% by mass) | | | | 100 | 100 | 100 | 100 | 100 | 100 |
| Amount of solvent having surface tension of not more than 27 mN/m | | | | 5 | 90 | 25 | 25 | 25 | 25 |
| Storage stability | | | | A | A | C | B | B | B |
| Wiping resistance | | | | B | B | S | S | S | B |

As shown in Tables 2 and 3, in Examples 1 to 13, each of which used an ink that contained a modified silicone oil having a surface tension of not more than 27 mN/m in an amount of at least 15% by mass but not more than 80% by mass relative to the total mass of the ink, excellent results were obtained for both the storage stability and the wiping resistance.

In contrast, as shown in Table 4, in Comparative Example 1, the amount of the modified silicone oil having a surface tension of not more than 27 mN/m was small, and the wiping resistance was poor.

In Comparative Example 2, the amount of the modified silicone oil having a surface tension of not more than 27 mN/m was 90% by mass, and the wiping resistance was poor.

Comparative Example 3 used a neutral carbon black, and the storage stability was poor.

Comparative Examples 4 and 5 used a chain-like silicone oil and a cyclic silicone oil respectively rather than a modified silicone oil, and in each case, the storage stability was poor. Comparative Example 6 used a modified silicone oil having a high surface tension, and the storage stability and the wiping resistance were both poor.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:
1. An oil-based inkjet ink comprising a pigment, a pigment dispersant and a non-aqueous solvent, wherein the pigment comprises an acidic carbon black having a pH of 2 to 6, the non-aqueous solvent contains a modified silicone oil having a surface tension of not more than 27 mN/m at 23° C., and an amount of the modified silicone oil, relative to a total mass of the oil-based inkjet ink, is at least 15% by mass but not more than 80% by mass.

2. The oil-based inkjet ink according to claim 1, wherein the amount of the modified silicone oil, relative to the total mass of the oil-based inkjet ink, is at least 15% by mass but not more than 70% by mass.

3. The oil-based inkjet ink according to claim 1, wherein the modified silicone oil has a surface tension of not more than 26 mN/m at 23° C.

4. The oil-based inkjet ink according to claim 1, wherein the amount of the modified silicone oil, relative to the total mass of the non-aqueous solvent, is at least 20% by mass.

\* \* \* \* \*